(12) United States Patent
Xu et al.

(10) Patent No.: US 9,888,803 B2
(45) Date of Patent: Feb. 13, 2018

(54) WOK APPARATUS APPLICABLE TO FULLY AUTOMATED COOKING MACHINE

(71) Applicants: Jinbiao Xu, Guangdong (CN); Guang He, Guangdong (CN)

(72) Inventors: Jinbiao Xu, Guangdong (CN); Guang He, Guangdong (CN)

(*) Notice: Subject to any disclaimer, the term of this patent is extended or adjusted under 35 U.S.C. 154(b) by 184 days.

(21) Appl. No.: 14/770,830

(22) PCT Filed: Mar. 7, 2013

(86) PCT No.: PCT/CN2013/072306
§ 371 (c)(1),
(2) Date: Dec. 4, 2015

(87) PCT Pub. No.: WO2014/131207
PCT Pub. Date: Sep. 4, 2014

(65) Prior Publication Data
US 2016/0128503 A1    May 12, 2016

(30) Foreign Application Priority Data
Feb. 28, 2013  (CN) .......................... 2013 1 0065107

(51) Int. Cl.
*A47J 37/08* (2006.01)
*A47J 27/62* (2006.01)
(Continued)

(52) U.S. Cl.
CPC .............. *A47J 27/004* (2013.01); *A47J 27/00* (2013.01); *A47J 36/2483* (2013.01);
(Continued)

(58) Field of Classification Search
CPC ...... A47J 27/00; A47J 27/004; A47J 36/2483; H05B 6/062; H05B 6/12; H05B 2206/02
(Continued)

(56) References Cited

U.S. PATENT DOCUMENTS

| 4,173,925 A | * | 11/1979 | Leon | ...................... | A47J 27/14 |
| | | | | | 219/389 |
| 4,503,502 A | * | 3/1985 | Chapin | .................. | A47J 27/14 |
| | | | | | 700/90 |

(Continued)

FOREIGN PATENT DOCUMENTS

| CN | 1459268 A | 12/2003 |
| CN | 1555748 A | 12/2004 |

(Continued)

OTHER PUBLICATIONS

International Search Report of PCT Patent Application No. PCT/CN2013/072306 dated Aug. 1, 2013.
(Continued)

*Primary Examiner* — Dana Ross
*Assistant Examiner* — Lindsey C Staubach

(57) ABSTRACT

A wok apparatus applicable to fully automated cooking machine includes a wok, electromagnetic heating coils, an electromagnetic heating device, a wok rotating device and a wok working position controlling device, wherein the electromagnetic heating coils wind around an external wall of the wok and heat the wok under the control of the electromagnetic heating device, the wok rotating device is connected with the wok so as to control the wok to rotate 360 degrees; the wok working position controlling device is used for securing the wok to a frame of the cooking machine and rotating the wok to respective working positions to perform respective operations, the electromagnetic heating device, the wok rotating device and the wok working position controlling device are all connected with a main control device of the cooking machine, so as to receive control commands and perform corresponding operations according to the control commands.

9 Claims, 9 Drawing Sheets

(51) Int. Cl.
  *A47J 37/06* (2006.01)
  *H05B 6/12* (2006.01)
  *A47J 27/00* (2006.01)
  *A47J 36/24* (2006.01)
  *H05B 6/06* (2006.01)

(52) U.S. Cl.
  CPC ............... *H05B 6/062* (2013.01); *H05B 6/12* (2013.01); *H05B 2206/02* (2013.01)

(58) Field of Classification Search
  USPC ............ 99/325, 326, 331; 219/620–622, 624
  See application file for complete search history.

(56) References Cited

U.S. PATENT DOCUMENTS

| 5,512,733 | A * | 4/1996 | Takikawa | H05B 6/1227 219/620 |
| 6,927,366 | B2 * | 8/2005 | Sawhney | A47J 37/108 219/429 |
| 7,930,973 | B2 * | 4/2011 | Wong | A47J 36/165 366/144 |
| 2004/0159244 | A1 * | 8/2004 | Leason | A47J 36/165 99/348 |
| 2006/0254429 | A1 * | 11/2006 | Sinton | A47J 27/004 99/348 |
| 2008/0282904 | A1 * | 11/2008 | Liu | A47J 36/165 99/352 |
| 2011/0300270 | A1 * | 12/2011 | Koppens | A47J 27/004 426/115 |
| 2012/0217236 | A1 * | 8/2012 | Takagi | A47J 27/004 219/647 |
| 2014/0069282 | A1 * | 3/2014 | He | A47J 44/02 99/348 |
| 2015/0182070 | A1 * | 7/2015 | Leijenaar | A47J 43/085 99/348 |
| 2015/0335204 | A1 * | 11/2015 | Palmer | B01F 9/0001 99/348 |

FOREIGN PATENT DOCUMENTS

| CN | 101233905 A | 8/2008 |
| CN | 101720873 A | 6/2010 |
| CN | 102813445 A | 12/2012 |

OTHER PUBLICATIONS

1st Office Action of counterpart Chinese Patent Application No. 201310065107.X dated Jul. 10, 2014.

* cited by examiner

WOK APPARATUS APPLICABLE TO FULLY AUTOMATED COOKING MACHINE

FIELD OF THE INVENTION

The present invention relates to the technical field of intelligent household electrical appliance, more particularly to a wok apparatus applicable to fully automated cooking machine.

BACKGROUND OF THE INVENTION

Chinese culinary art is extensive and profound and has a variety of cooking techniques, which mainly comprise: stir frying, stewing, deep frying, boiling, steaming, pan frying, grilling, etc. The essence of various cooking techniques is to cook ever-changing dishes with various tastes and flavors by changing food match and controlling heating. Up to now, cooking process involves a lot of manual labor and relies very much on the cooker's experience and skills.

There exist some automated cooking machines. However, the wok devices employed by these existing cooking machines have disadvantages of low heating speed, bad stir-fry effect and low automation level.

SUMMARY OF THE INVENTION

The present invention aims to provide a wok apparatus applicable to fully automated cooking machine, which has high level of automation and is capable of rotating the wok to various working positions so as to perform various cooking operations according to recipe commands, wherein the wok may be fast heated and various stir-fry effects may be realized during the heating.

In order to achieve the above goal, the present invention provides a wok apparatus for a fully automated cooking machine, comprising: a wok, electromagnetic heating coils, an electromagnetic heating device, a wok rotating device and a wok working position controlling device, wherein the electromagnetic heating coils wind around the external wall of the wok and heat the wok under the control of the electromagnetic heating controlling device; the wok rotating device is connected with the wok so as to control the wok to rotate; the wok working position controlling device is used for securing the wok to a frame of the cooking machine and driving the wok to rotate, so as to rotate the wok to respective working positions to perform respective operations; the electromagnetic heating controlling device, wok rotating device and wok working position controlling device are all connected with a main control device of the cooking machine, so as to receive control commands sent from the main control device according to preset recipe commands, and perform operations of heating, rotating and stir-frying for the wok according to the control commands.

Preferably, the wok rotating device comprises a rotating shaft and a stir-frying motor, wherein the rotating shaft is fixedly connected with the wok, the motor drives the rotating shaft to rotate when receiving rotating control commands sent from the main control device, thereby realizing 360-degree rotation of the wok.

Preferably, the wok working position controlling device comprises a wok frame, a main shaft, a position controlling motor and a position controlling detector, wherein the wok frame is used for securing the wok and is hold on the frame of the cooking machine by the main shaft, the position controlling motor drives the main shaft to rotate under the control of the main control device, and thus drives the wok frame as well as the wok to rotate to respective working positions so as to perform respective operations, the position controlling detector is used for detecting rotation angle of the wok frame and the wok and sending the detected data to the main control device.

Preferably, the wok frame is an n-shaped wok frame, which comprises two vertical poles and a transverse supporting beam arranged between the two vertical poles, wherein the two vertical poles are respectively held on the frame of the cooking machine by the main shaft. The transverse supporting beam is provided with a through-hole at the center so as to allow the rotating shaft of the wok rotating device to pass through, and the transverse supporting beam is also provided with a bearing at the through-hole. The rotating shaft is arranged with a locating ring cooperating with the bearing, so that the wok and the wok rotating device may be fixedly secured on the n-shaped wok frame.

Preferably, the transverse supporting beam is provided with two coil frames extending upwards near the electromagnetic heating coils for securing the electromagnetic heating coils, allowing the electromagnetic heating coils to wind around the external wall of the wok without contacting.

Preferably, the electromagnetic heating coils are made of a hemisphere-shaped heat-resistant bobbin winded with high frequency fine copper heating coil.

Preferably, the electromagnetic heating controlling device comprises a wok temperature detector and a high frequency driving source, wherein the high frequency driving source is connected with the electromagnetic heating coils. When the heating control command sent from the main control device is received, current flows through the electromagnetic heating coils to heat the wok. The wok temperature detector is used for detecting the temperature of the external wall of the wok and sending the detected data to the main control device.

Preferably, the body of the wok comprises a hollow cylinder-shaped upper part and a hemisphere-shaped lower part.

Preferably, a plurality of stirring pieces are arranged on the internal wall of the lower part of the wok.

Preferably, the electromagnetic heating coils wind around the external wall of the lower part of the wok.

Preferably, the internal wall of the wok is coated with a non-stick material layer having excellent heat resistance.

The wok apparatus applicable to fully automated cooking machine provided by the present invention has advantages as follows:

1. It is fully automated, and is capable of cooperating with the main control device of the automated cooking machine so as to realize precise heating control required by Chinese culinary art and stir-fry the raw ingredients.

2. Due to the electromagnetic heating and the application of electromagnetic induction eddy current heating principle, a three-dimensional surround hemisphere heating temperature field which heats quickly and has high thermal efficiency is formed in the wok. It is an energy-efficient cooking apparatus which forms a heating temperature field with a similar effect as traditional blowing-type cook-stoves heating wok, and greatly meets the requirement of heating control in Chinese culinary art.

3. Various stir frying effects are realized by utilizing combination control method for rotation motions which is similar to a roller rotating and stirring. Various effects like saute-stirring and stir-frying can be realized by combining various rotation modes including high-speed rotation, low-speed rotation, clockwise rotation and anti-clockwise rotation. The stir frying effect like tossing the pan can be realized by cooperatively using additional stirring pieces arranged in the wok and controlling the inclination angle of the wok frame.

4. Many functions during the automatic cooking process such as ingredient feeding, cooking, dish discharging, wok washing and so on may be realized by the position control (control of inclination angle) for the wok frame (the wok).

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
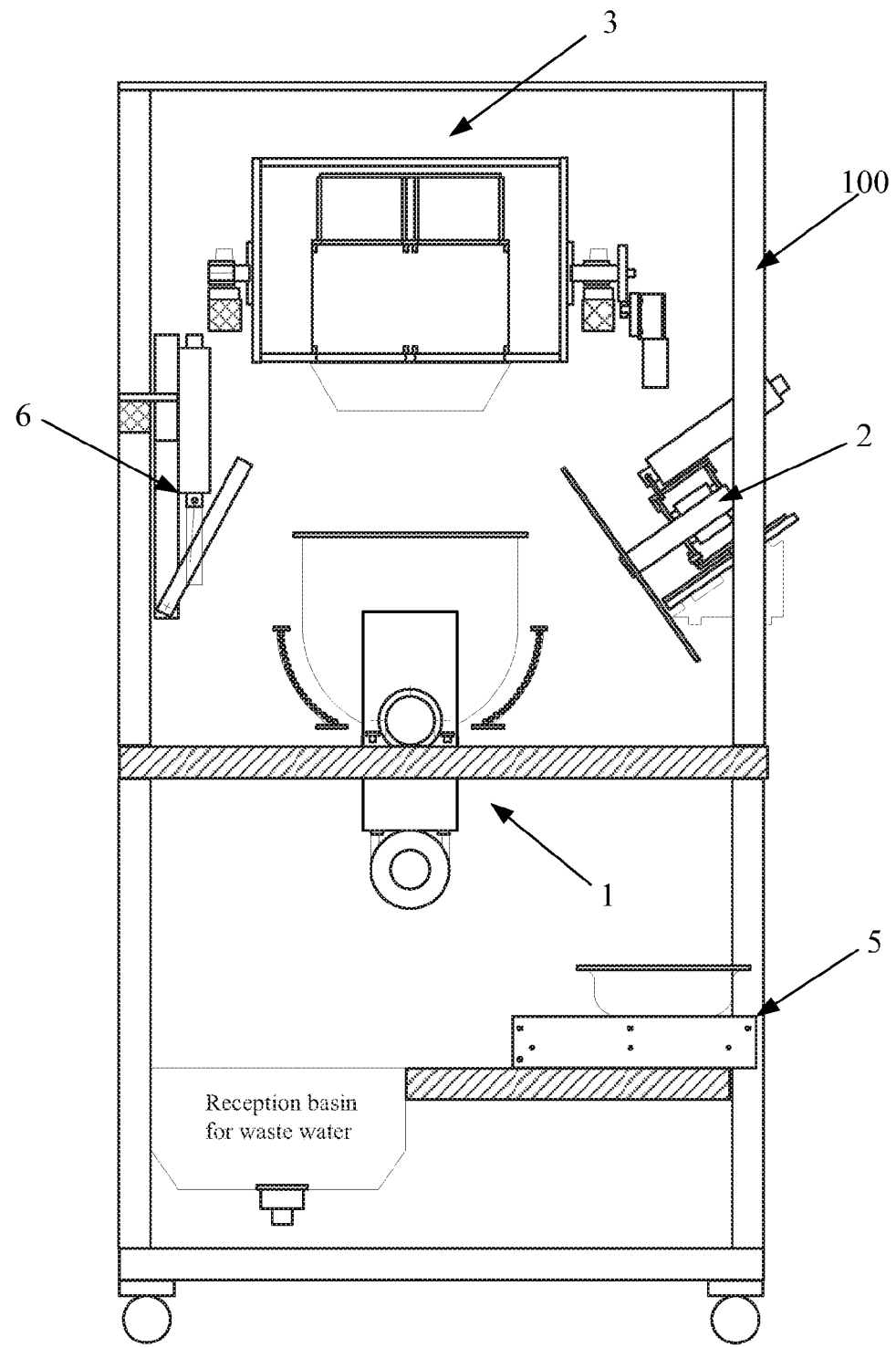
FIG. 1 is a structure diagram of an automated cooking machine applicable to the wok apparatus according to an embodiment of the present invention.
Figure 2:
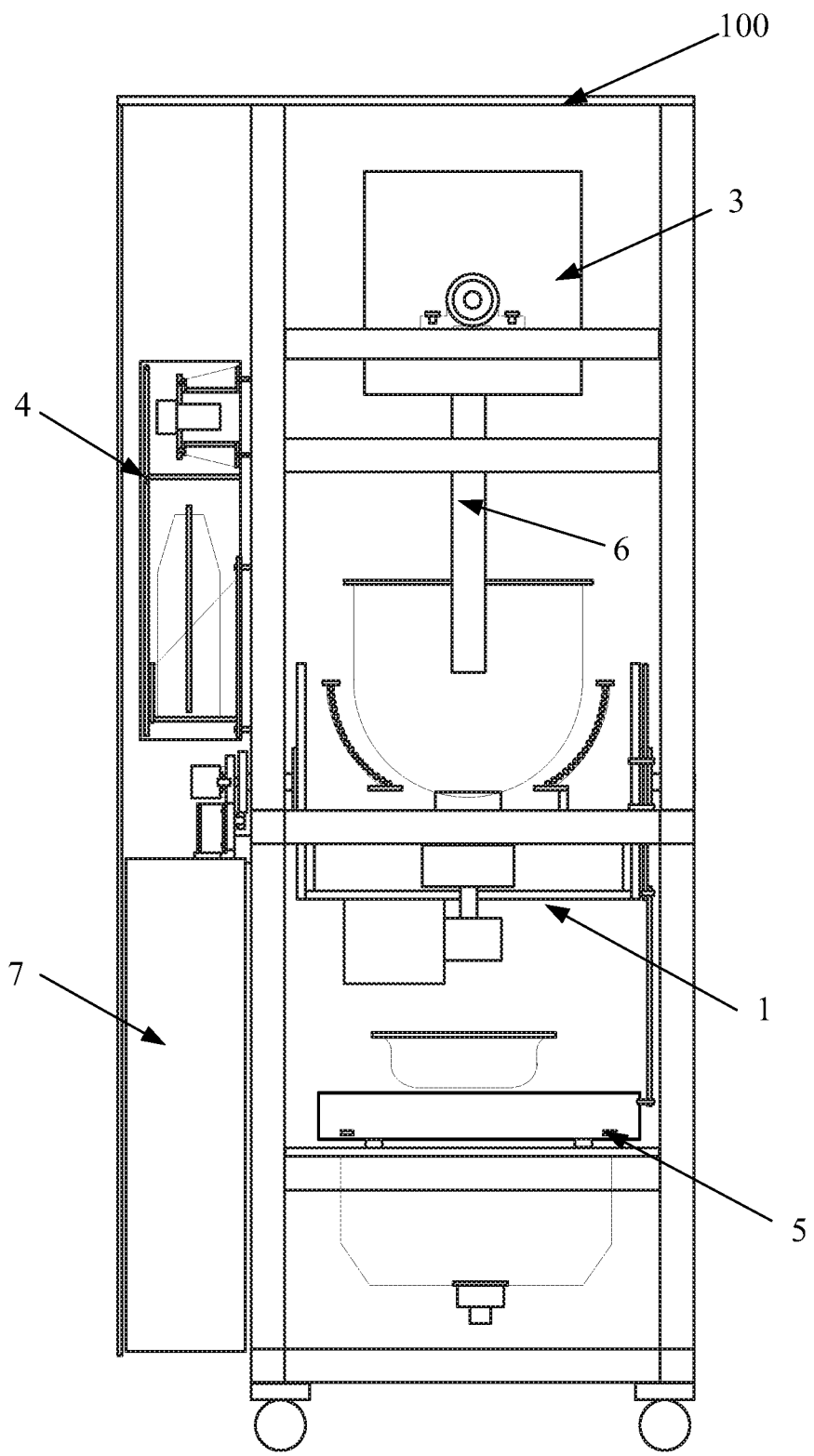
FIG. 2 is another structure diagram of the automated cooking machine shown in FIG. 1.

At first, referring to FIGS. 1-2, the wok apparatus provided by the present invention is applicable to fully automated cooking machine, wherein the fully automated cooking machine comprises, but is not limited to, the following items: a wok apparatus 1 arranged in the housing 100 of the cooking machine, a wok lid controlling device 2, an automatic major ingredient feeding device 3, an automatic accessory ingredient adding device 4, an automatic dish discharging device 5, an automatic wok washing device 6 and a main control device 7, wherein the main control device 7 is used for receiving preset recipe commands and sending corresponding control commands according to the recipe commands, the wok apparatus 1, wok lid controlling device 2, automatic major ingredient feeding device 3, automatic accessory ingredient adding device 4, the automatic dish discharging device 5 and the automatic wok washing device 6 are respectively connected with the main control device 7, and perform respective operations according to the received control commands, thereby realizing full-automatic cooking.

Figure 3:
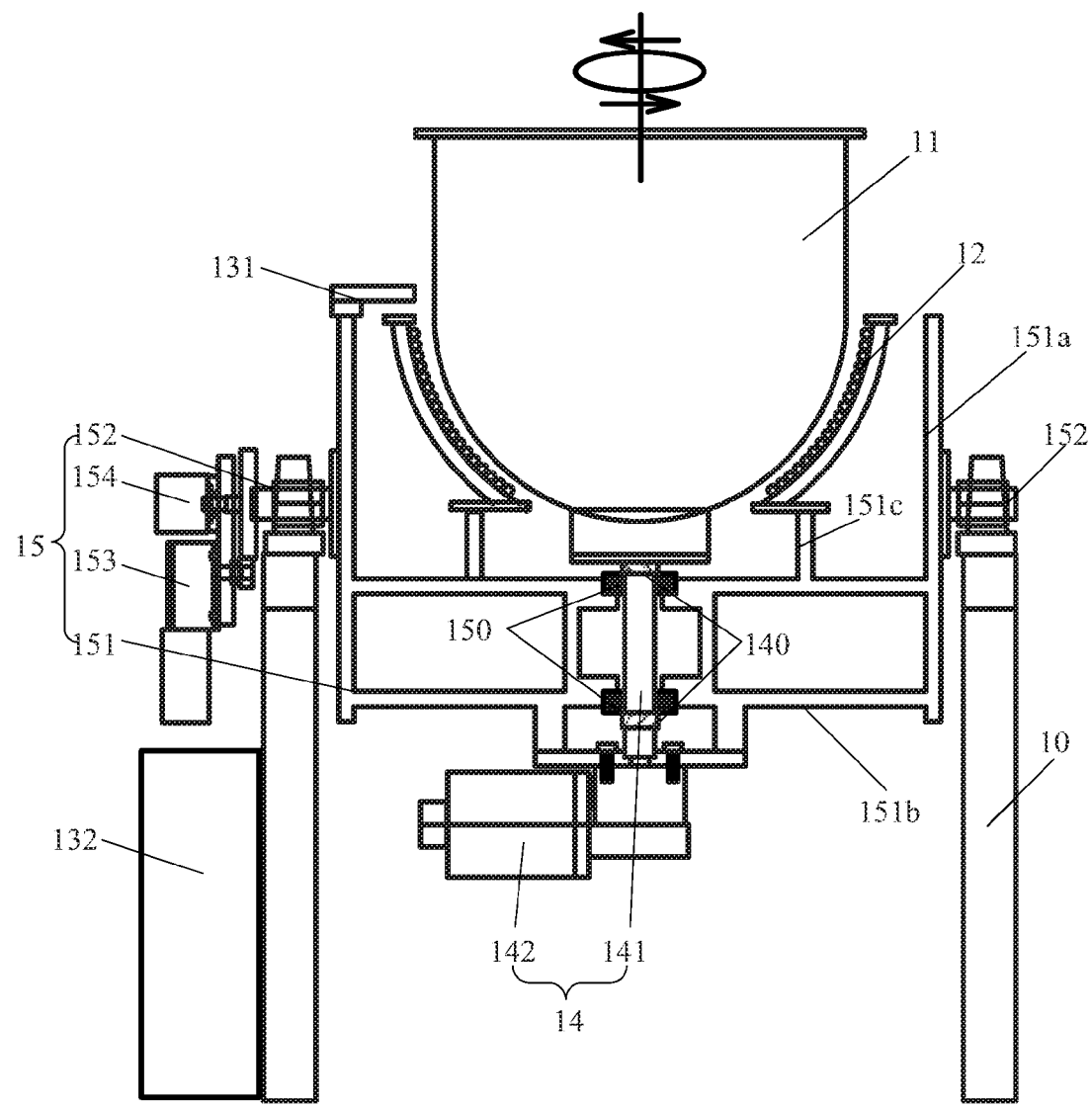
FIG. 3 is a structure diagram of a wok apparatus applicable to fully automated cooking machine according to an embodiment of the present invention.
Figure 4:
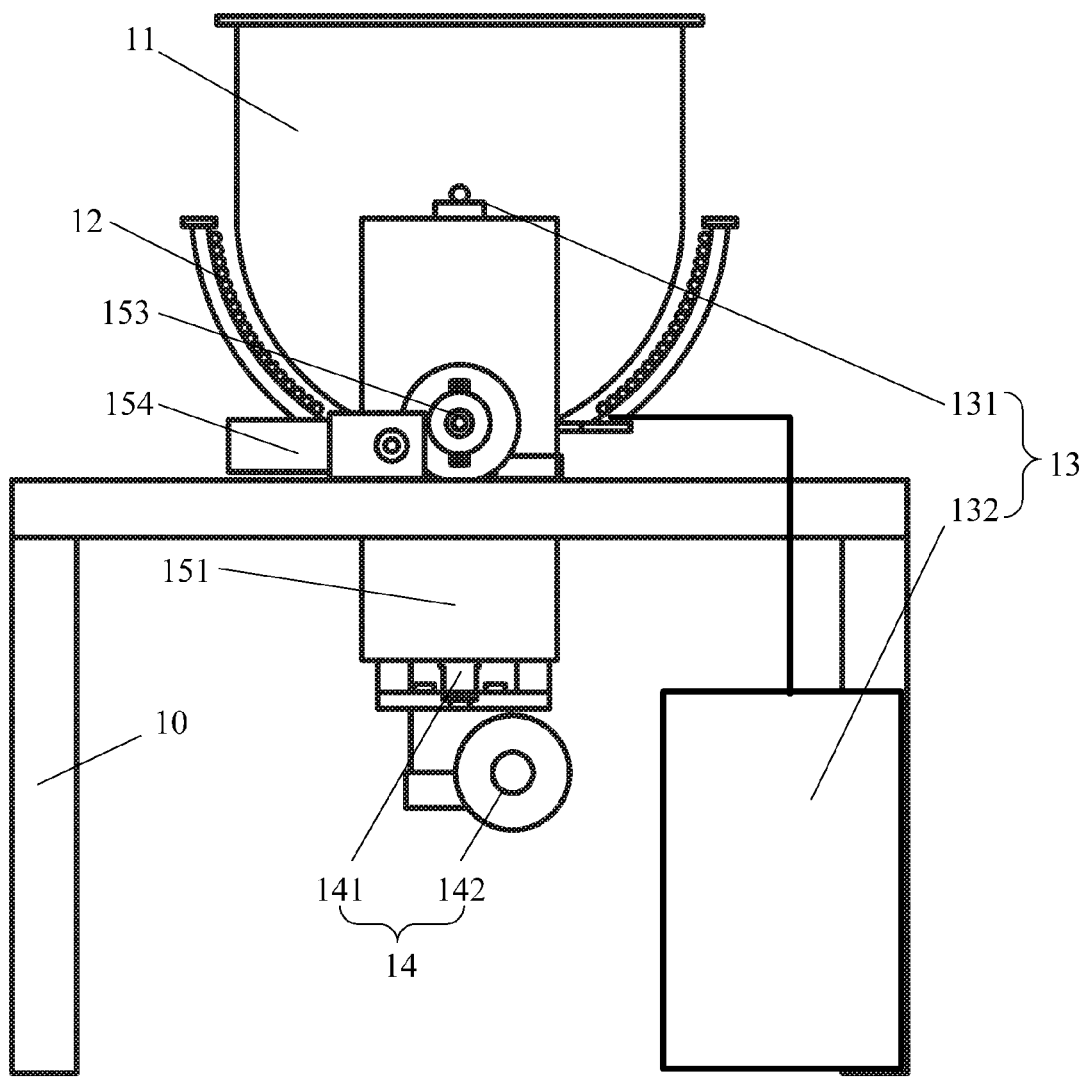
FIG. 4 is another structure diagram of the wok apparatus applicable to fully automated cooking machine shown in FIG. 3.

Referring to FIG. 3 and FIG. 4, the structure of the wok apparatus applicable to fully automated cooking machine according to the present invention is described in detail as below. Thereinto, it can be understood that FIG. 3 and FIG. 4 are structure diagrams of one embodiment, only different in viewing angle. The wok apparatus applicable to fully automated cooking machine comprises a frame 10, a wok 11, electromagnetic heating coils 12, an electromagnetic heating device 13, a wok rotating device 14 and a wok working position controlling device 15, wherein the electromagnetic heating coils 12 wind around the external wall of the wok 11 and heat the wok 11 under the control of the electromagnetic heating controlling device 13; the wok rotating device 14 is connected with the wok 11 so as to control the wok 11 to rotate 360 degrees; the wok working position controlling device 15 is used for securing the wok 11 to the frame 10 and driving the wok 11 to rotate 360 degrees, so as to rotate the wok 11 to respective working positions to perform respective operations; the electromagnetic heating device 13, wok rotating device 14 and wok working position controlling device 15 are all connected with a main control device 7 (FIG. 5) of the cooking machine, so as to receive control commands sent from the main control device 7 according to preset recipe commands, and perform corresponding operations according to the control commands.

Figure 6:
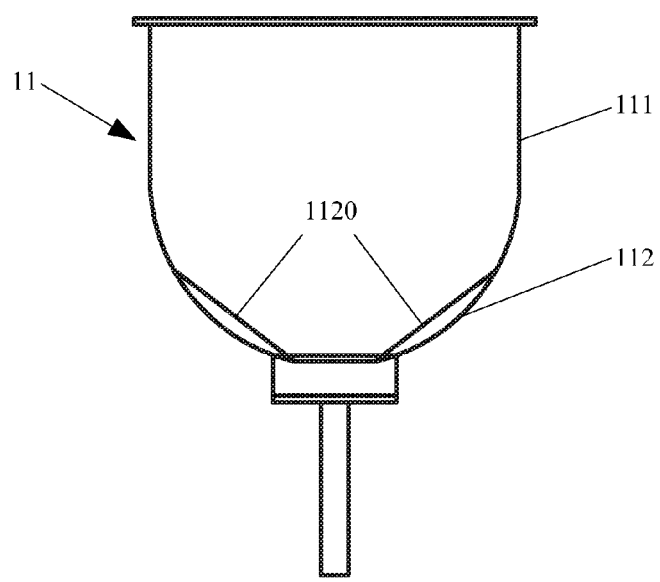
FIG. 6 is a wok structure diagram of the wok apparatus applicable to fully automated cooking machine shown in FIG. 3.
Figure 7A:
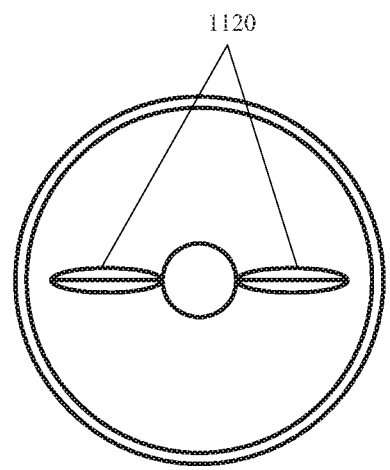
FIGS. 7a-7c show woks shown in FIG. 6 having a different number of stirring pieces.
Figure 7B:
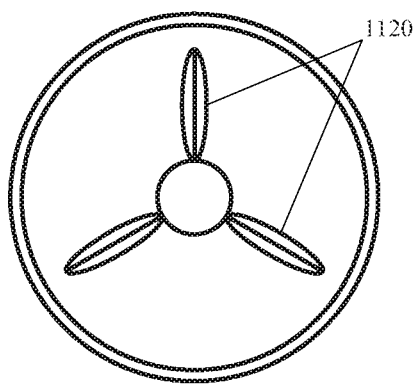
Figure 7C:
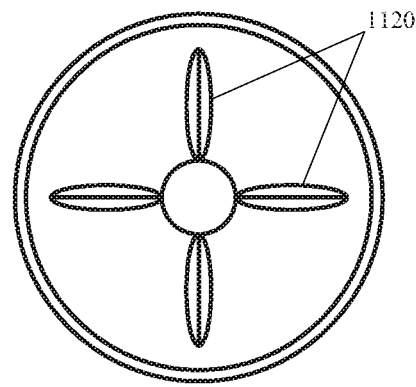
Figure 8A:
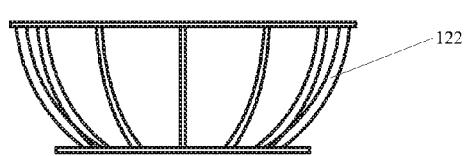
FIG. 8a-8d show the structure of electromagnetic heating coils of the wok apparatus applicable to fully automated cooking machine shown in FIG. 3.
Figure 8C:
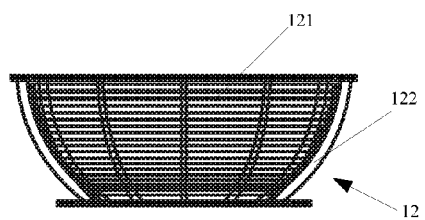
Figure 8B:
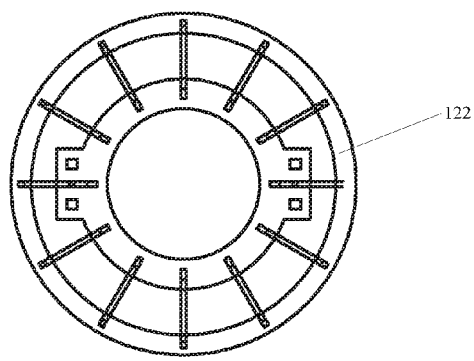
Figure 8D:
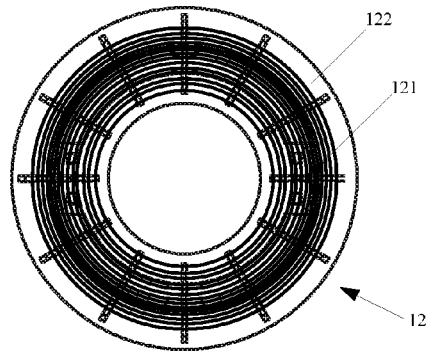

Referring to FIG. 6, the cylinder body of the wok 11 comprises a hollow cylinder-shaped upper part 111 and a hemisphere-shaped lower part 112. Furthermore, a plurality of stirring pieces 1120 for stirring foods are arranged on the internal wall of the lower part 112 of the wok 11, so as to achieve stir-frying effects like tossing the pan when the wok 11 rotates and cooks. Thereinto, the stirring pieces 1120 arranged on the internal wall of the lower part 112 of the wok 11 may be duplex stirring pieces (FIG. 7a), triple stirring pieces (FIG. 7b) or quadruple stirring pieces (FIG. 7c). The wok 11 is a stainless iron wok which is applicable to electromagnetic heating. The wok 11 has the entire internal wall coated with a non-stick material layer having excellent heat resistance and has many functions including non-sticking of foods, self-cleaning, easy dish discharging and wok washing, and less oil cooking.

Referring to FIGS. 8a-8d, the electromagnetic heating coils 12 are made by a heat-resistant hemisphere shaped bobbin 122 winded with high frequency fine copper heating coil 121. The electromagnetic heating coils 12 wind around the external wall of the lower part 112 of the wok 11 into a hemisphere shape and heat the wok 11 under the control of the electromagnetic heating device 13. Due to the electromagnetic heating, a three-dimensional surround hemisphere heating temperature field which heats quickly and has high thermal efficiency is formed in the wok 11. The formed heating temperature field has a similar effect as traditional blowing-type cook-stoves heating wok, it greatly meets the requirement of heating control in Chinese culinary art and is energy-efficient. In addition, since the electromagnetic heating does not have time-lag, heating control performed in this way is much more sensitive than that performed in other ways such as traditional open fires and resistance generating and conducting.

Figure 5:
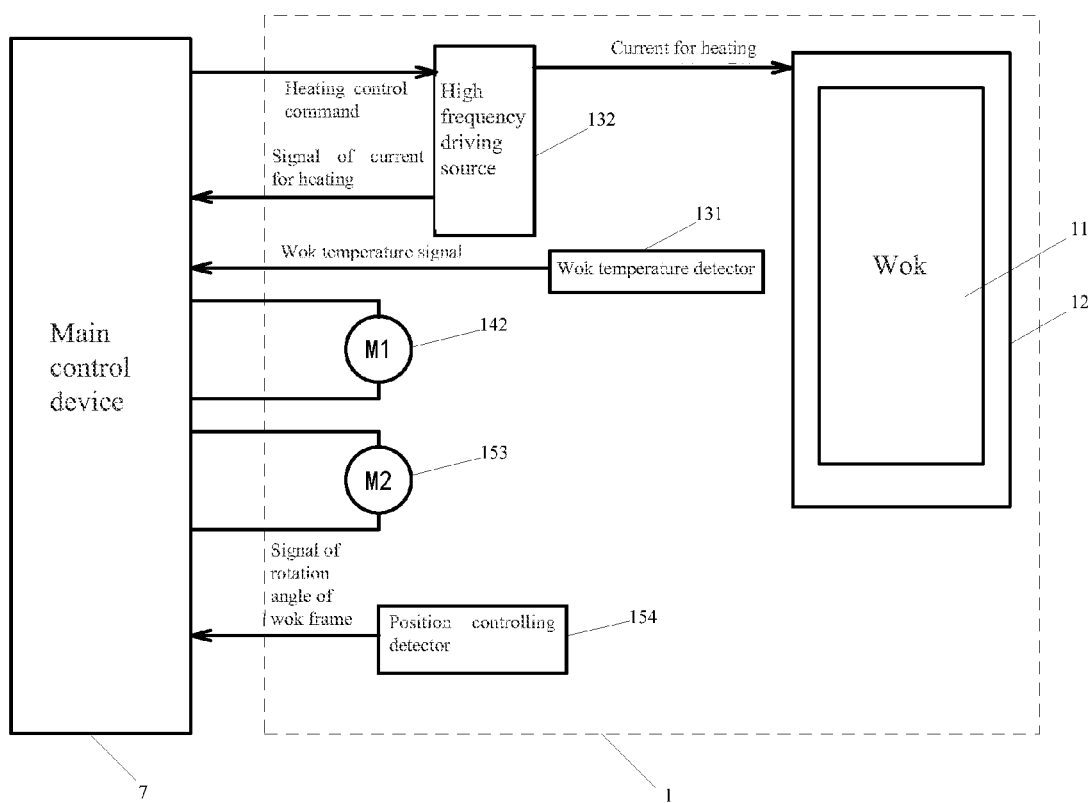
FIG. 5 is an electrical component diagram of the wok apparatus applicable to fully automated cooking machine shown in FIG. 3.

Referring to FIGS. 3, 5, the electromagnetic heating device 13 comprises a wok temperature detector 131 and a high frequency driving source 132. The high frequency driving source 132 is respectively connected with the electromagnetic heating coils 12 and the main control device 7 of the cooking machine. When heating control command sent from the main control device 7 is received, current is switched on for the electromagnetic heating coils 12 to heat the wok 11. The wok temperature detector 131 is an infrared thermometer, which is used for detecting the temperature of the external wall of the wok 11 and sending the detected data to the main control device 7, so as to effectively control the high frequency driving source 132 and thus the current intensity and heating time of the electromagnetic heating coils 12. In the present embodiment, the function of precise heating control required by Chinese culinary art is realized by the control of heating temperature and heating time. The heating temperature is controlled by adjusting the current intensity of the electromagnetic heating coils 12 and making the wok temperature stable in the range of controlling value. Since the electromagnetic heating does not have time-lag, heating control performed in this way is much more sensitive than that performed in other ways such as traditional open fires and resistance generating and conducting. When it is further cooperated with precise control of heating time, the function of heating control required by Chinese culinary art can be fully realized.

Referring to FIG. 3 and FIG. 4, the wok rotating device 14 comprises a rotating shaft 141 and a stir-frying motor 142, wherein the rotating shaft 141 is fixedly connected with the wok 11, and the stir-frying motor 142 is connected with the main control device 7 of the automated cooking machine (FIG. 5). When rotating control command sent from the main control device is received, the rotating shaft 141 is driven to rotate and thus the wok 11 is driven to rotate 360 degrees. In particular, the rotating shaft 141 is fixedly connected at one end to the lower part 112 of the wok 11 (the lower part 112 of the wok 11 bulges downwards and formed with a recess for fixedly connecting with the rotating shaft 141), and is connected at another end to the stir-frying motor 142. The rotating shaft 141 is driven to rotate by the stir-frying motor 142 and thus drives the wok 11 to realize various rotation motions. Rotating function of the wok of the present embodiment realizes various stir frying effects by utilizing combination control method for rotation motions which is similar to a roller rotating and stirring. Various effects like saute-stirring and stir-frying can be realized by sending rotating control commands with different parameters to control the stir-frying motor 142 and combining various rotation modes for the wok 11 including high-speed rotation, low-speed rotation, clockwise rotation and anti-clockwise rotation. In addition, the stir frying effect like tossing the pan can be realized by cooperatively using additional stirring pieces 1120 arranged in the wok 11 and controlling the inclination angle of the wok 11 (the wok working position controlling device).

Referring again to FIG. 3 and FIG. 4, the wok working position controlling device 15 comprises a wok frame 151, a main shaft 152, a position controlling motor 153 and a position controlling detector 154, wherein the wok frame 151 is used for securing the wok 11 and is held on the frame of the cooking machine by the main shaft 152. Thereinto, the main shaft 152 is connected at one end with the position controlling motor 153, and the position controlling motor 153 is electrically connected with the main control device 7 of the cooking machine. The position controlling motor 153 drives, under the control of the main control device 7, the main shaft 153 to rotate and thus drives the wok frame 151 as well as the wok 11 to rotate to respective working positions to perform respective operations. The position controlling detector 154 is used for detecting the rotation angle of the wok frame 151 and the wok 11, and sending the detected data to the main control device 7, whereby precisely controlling the wok frame 151 and the wok 11 to rotate to corresponding working positions.

Preferably, in the present embodiment, the wok frame 151 is an n-shaped wok frame which comprises two vertical poles 151a and a transverse supporting beam 151b arranged between the two vertical poles 151a, wherein the two vertical poles 151a are respectively held on the frame 10 of the cooking machine by the main shaft 152. The n-shaped wok frame is used for securing and holding the wok 11 and the wok rotating device 14. In particular, the transverse supporting beam 151b is provided with a through-hole at the center so as to allow the rotating shaft 141 of the wok rotating device 14 to pass through, and the transverse supporting beam 151b is also provided with a bearing 150 at the through-hole. The rotating shaft 141 is arranged with a locating ring 140 cooperating with the bearing 150, so that the wok 11 and the wok rotating device 14 may be fixedly secured on the n-shaped wok frame 151. In addition, the transverse supporting beam 151b is provided with two coil frames 151c extending upwards near the electromagnetic heating coils 12 for supporting and securing the electromagnetic heating coils 12, allowing the electromagnetic heating coils 12 to wind around the external wall of the wok 11 without contacting. It is understandable that, the wok temperature detector 131 of the electromagnetic heating controlling device 13 may be arranged at the top of the wok frame 151, close to the external wall of the wok 11. The high frequency driving source 132 may be secured on the frame of cooking machine, so as to facilitate the connection with main control device 7 of the cooking machine.

Thus it can be seen that, along with the rotation of the wok frame 151 under the control of the wok working position controlling device 15, the wok 11, electromagnetic heating coils 12 and the wok rotating device 14 synchronously rotate with the wok frame 151 to respective working positions to perform respective operations.

Referring to FIG. 9a-9d, according to respective mounted positions of operating devices of the fully automated cooking machine, five working positions are provided in the present embodiment, i.e. a major ingredient feeding working position, an accessory ingredient adding (cooking) working position, a dish discharging working position, a wok washing working position and a waste water draining working position. The wok frame 151 is capable of driving the wok 11 to rotate to each working position, and making the wok 11 face towards each corresponding operating device so as to perform corresponding automatic cooking operations such as ingredient feeding, cooking (accessory ingredient adding), dish discharging, wok washing, waste water draining, etc.

Figure 9A:
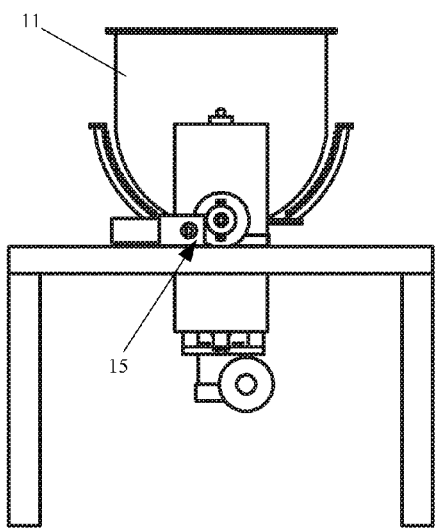
FIG. 9a-9d show operating conditions of the wok at different working positions under the control of the wok working position controlling device of the wok apparatus applicable to fully automated cooking machine shown in FIG. 3.

When the wok working position controlling device 15 receives a major ingredient feeding control command, the wok 11 is rotated to the ingredient feeding working position (which is vertical position, namely the original position), so as to make the wok face towards the automatic major ingredient feeding device 6. At this moment, the wok apparatus is in a working state as shown in FIG. 9a.

Figure 9B:
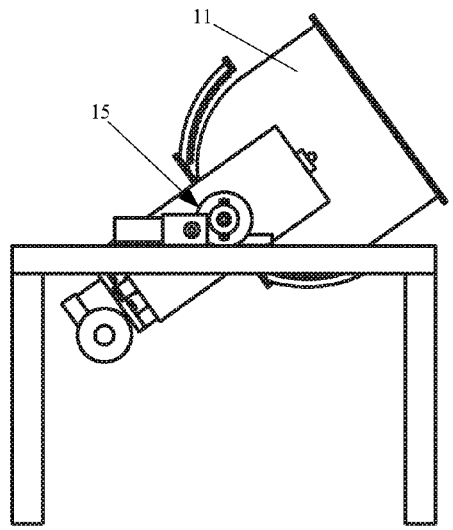

When the wok working position controlling device 15 receives an accessory ingredient adding command or a rotating control command, the wok 11 is rotated to an accessory ingredient (cooking) working position (which is preferably a position with a 45-degree angle to the original position) in a clockwise direction, so as to make the wok face towards the wok lid and the wok lid controlling device. At this moment, the wok apparatus is in a working state as shown in FIG. 9b.

Figure 9C:
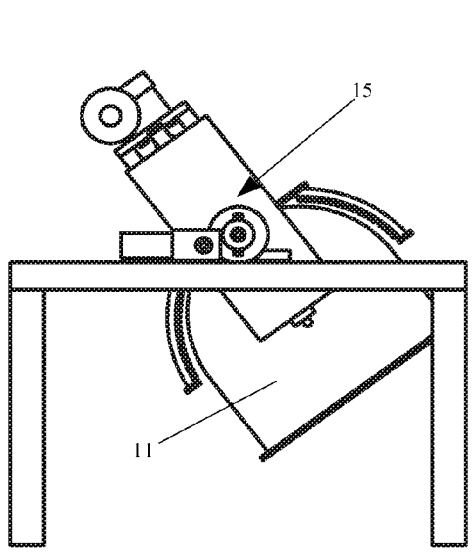

When the wok working position controlling device 15 receives a dish discharging control command, the wok is rotated to a dish discharging working position (which is preferably a position with a 135-degree angle to the original position) in a clockwise direction, so as to make the wok face towards the automatic dish discharging device. At this moment, the wok apparatus is in a working state as shown in FIG. 9c.

Figure 9D:
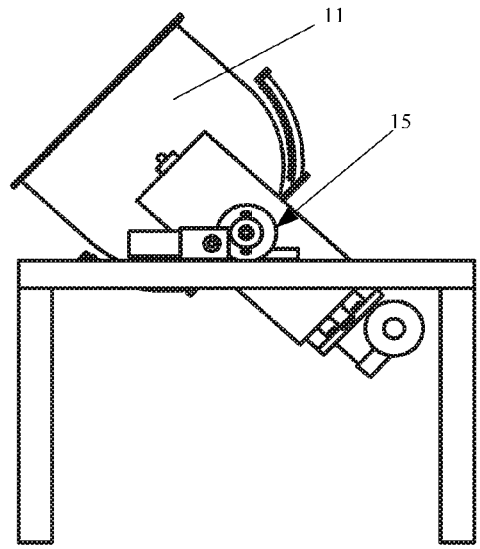

When the wok working position controlling device 15 receives a wok washing control command, the wok 11 is rotated to a wok washing working position (which is preferably a position with a 45-degree angle to the original position) in an anti-clockwise direction, so as to make the wok face towards the automatic wok washing device. At this moment, the wok apparatus is in a working state as shown in FIG. 9d. When receiving waste water draining control command after the wok washing is finished, the wok 11 is further rotated to waste water draining working position (which is preferably a position with an angle in a range of 225-235 degrees to the original position) in an anti-clockwise direction, so as to make the wok face towards a reception basin.

The wok apparatus of the present invention is applicable to programmable controlled fully automated cooking machine, more particularly to the fully automated cooking machine which is capable of automatically completing Chinese dish cooking process according to the recipe program programmed on the basis of general recipe commands vmmda1.0.

Thereinto, the program specification of the accepted recipe program supports general recipe commands vmmda1.0 of automatic Chinese dish cooking, which includes nine commands: F1 ingredient feeding command, F2 heat-adjusting command, F3 stop-heating command, F4 rotating command, F5 time delay command, F6 seasoning-feeding command, F7 open-lid command, F8 dish discharging command, F9 pause command. The recipe program programmed on the basis of the program specification runs by pipelined single task. The automated cooking machine of the present invention interprets and executes the recipe program according to the command sequence.

The general recipe program specification can be written in XML '1.0' and encoded in gb2312 for better data exchange and information sharing across platforms. So besides the programmable controlled intelligent cooking machine of the present invention, the recipe program can also be applied to a virtual cooking machine, cloud services, Internet of Things terminal, and so on.

The recipe program includes two parts, conformance statement and executable command sequence.

The conformance statement mainly includes: recipe program version, recipe number, recipe name, creator, creation date, ingredient packaging version and ingredient name.

The executable command sequence consists of general recipe commands vmmda1.0 of automatic Chinese dish cooking. As illustrated in Table 1 below, the basic syntax is as follows: index command; comment (may be omitted). Each line permits one command only. Generally, the whole executable command sequence should not be over 5000 lines.

TABLE 1

| Index | Command | Comment |
| --- | --- | --- |
| 1 | F2( ), 1; | Heat-adjusting command, parameter: 1(low) - 10(high) |
| 2 | F5( ), 30; | Time-delay command, parameter: seconds |
| 3 | F6A( ), 70; | Seasoning A(oil) feeding command, parameter: mL |

The programmable controlled intelligent cooking machine of the present invention executes each command according to the index sequence. The index can be omitted, and then the programmable controlled intelligent cooking machine executes each command from the top to the bottom. In the following example, the command sequences in Table 2 (a), Table 2 (b) and Table 2 (c) have the same function of executable command sequence.

TABLE 2 (a)

| 1 | F2( ), 1; | Heat-adjusting command, parameter: 1(low) - 10(high) |
| --- | --- | --- |
| 2 | F5( ), 30; | Time-delay command, parameter: seconds |
| 3 | F6A( ), 70; | Seasoning A(oil) feeding command, parameter: mL |

TABLE 2 (b)

| F2( ), 1 |
| --- |
| F5( ), 30 |
| F6A( ), 70 |

TABLE 2 (c)

| 2 | F5( ), 30 |
| --- | --- |
| 1 | F2( ), 1 |
| 3 | F6A( ), 70 |

All text editors may be used for writing the general recipe program. The recipe program may be written in XML '1.0' and encoded in gb2312. The root element is "cooking_machine_recipe", the sub-elements include "ingredient_package" and "recipe_command".

The root element "cooking_machine_recipe" has attributes as follows: recipe program version, recipe number, recipe name, creator and creation date. For example:
<cooking_machine_recipe version='vmmda 1.0' recipe_number='xjb0001' recipe_name='fried sliced cabbage' creator='xjb' date='03/07/12'>

The sub-element "ingredient package" is a null element with attributes as follows: version, compartment-A ingredient, compartment-B ingredient, compartment-C ingredient, compartment-D ingredient. For example:
<ingredient_package version='vmmda 1.0' compartment-A_ingredient='cabbage' compartment-B_ingredient='cabbage' compartment-C_ingredient='accessory ingredient' compartment-D_ingredient=' '></ingredient_package>

The sub-element "recipe_command" has attributes as follows: step, command code, parameter. The value of the sub-element "recipe command" is the comment. For example:
<recipe_command step='2' command_code='F2(3)' parameter='3'>heat-adjusting command, parameter 1 (low)-10 (high)</recipe_command>

The complete format of the recipe program is shown as follows:
<?xml version='1.0' encoding='gb2312'?>
<cooking_machine_recipe version='vmmda 1.0' recipe_number='xjb0001' recipe_name='fried sliced cabbage' creator='xjb' date='03/07/12'>
<ingredient_package version='vmmda 1.0' compartment_A_ingredient='cabbage' compartment_B_ingredient='cabbage' compartment_C_ingredient='accessory ingredient' compartment_D_ingredient=' '></ingredient_package>
<recipe_command step='1' command_code='F4(3)' parameter='3'>rotating command, parameter 1 (slow)-8 (fast)</recipe_command>
<recipe_command step='2' command_code='F2(3)' parameter='3'>heat-adjusting command, parameter 1(low)-10 (high)</recipe_command>
</cooking_machine_recipe>

As an example, a recipe program for cooking fried sliced cabbage is given as below.
<?xml version='1.0' encoding='gb2312'?><cooking_machine_recipe version='vmmda 1.0' recipe_number='xjb0001' recipe_name='fried sliced cabbage' estimated_time='437' creator='xjb' date='03/07/12'>
<major_ingredient_package version='vmmda 1.0' compartment_A_major_ingredient='cabbage' compartment_B_major_ingredient='cabbage' compartment_C_major_ingredient='cabbage' compartment_D_major_ingredient='accessory ingredient (garlics, etc.)'></major_ingredient_package>
<recipe_command step='2' command_code='F20' parameter='1'>heat-adjusting command, parameter 1 (low)-10 (high)</recipe_command>
<recipe_command step='3' command_code='F6A( )' parameter='40'>seasoning-A(oil)-feeding command, parameter is mL</recipe_command>
<recipe_command step='4' command_code='F3' parameter='0'>stop-heating command, no parameter</recipe_command>
<recipe_command step='5' command_code='F1D' parameter='0'>ingredient-feeding command, put ingredient D into the wok, no parameter</recipe_command>
<recipe_command step='6' command_code='F4( )' parameter='3'>rotating command, parameter 1 (slow)-8 (fast)</recipe_command>
<recipe_command step='7' command_code='F20' parameter='2'>heat-adjusting command, parameter 1 (low)-10 (high)</recipe_command>
<recipe_command step='8' command_code='F5( )' parameter='20'>time-delay command, parameter is the seconds</recipe_command>
<recipe_command step='9' command_code='F3' parameter='3'>stop-heating command, no parameter</recipe_command>
<recipe_command step='10' command_code='F1A' parameter='0'>ingredient-feeding command, put ingredient A into the wok, no parameter</recipe_command>
<recipe_command step='11' command_code='F1B' parameter='0'>ingredient-feeding command, put ingredient B into the wok, no parameter</recipe_command>
<recipe_command step='12' command_code='F1C' parameter='0'>ingredient-feeding command, put ingredient C into the wok, no parameter</recipe_command>
<recipe_command step='13' command_code='F4( )' parameter='5'>rotating command, parameter 1 (slow)-8 (fast)</recipe_command>
<recipe_command step='14' command_code='F2( )' parameter='2'>heat-adjusting command, parameter 1 (low)-10 (high)</recipe_command>
<recipe_command step='15' command_code='F5( )' parameter='100'>time-delay command, parameter is the seconds</recipe_command>
<recipe_command step='16' command_code='F6C( )' parameter='50'>seasoning-C(soy sauce)_feeding command, parameter is mL</recipe_command>
<recipe_command step='17' command_code='F6D( )' parameter='20'>seasoning-D(vinegar)_feeding command, parameter is mL</recipe_command>
<recipe_command step='18' command_code='F6G( )' parameter='10'>seasoning-G(sesame oil)_feeding command, parameter is mL</recipe_command>
<recipe_command step='19' command_code='F5( )' parameter='100'>time-delay command, parameter is the seconds</recipe_command>
<recipe_command step='20' command_code='F3' parameter='0'>stop-heating command, no parameter</recipe_command>
<recipe_command step='21' command_code='F5( )' parameter='100'>time-delay command, parameter is the seconds</recipe_command>
<recipe_command step='22' command_code='F9' parameter='0'>halt command, no parameter</recipe_command>
</cooking_machine_recipe>

Figure 10:
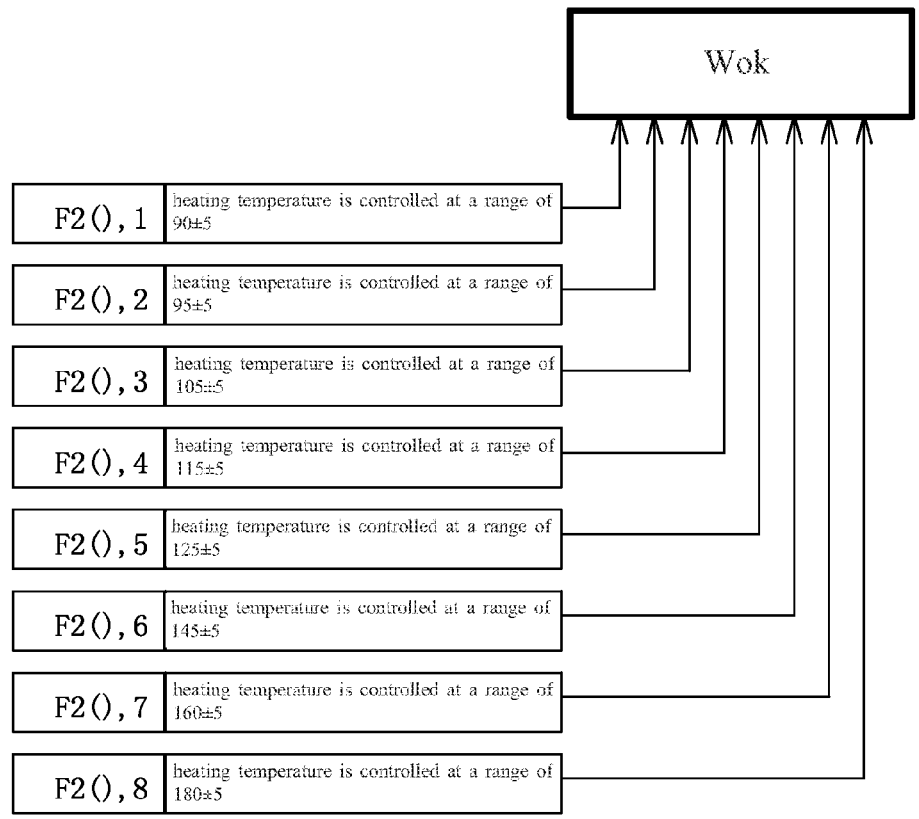
FIG. 10 is a component diagram of the electromagnetic heating device of the wok apparatus applicable to fully automated cooking machine receiving heating control commands.

In the wok apparatus of the present invention, the electromagnetic heating device 13 and electromagnetic heating coils 12 cooperate with the main control device 7 of the automatic cooking machine to support "F2 heat-adjusting command" of the recipe command system vmmda1.0. The "F2 heat-adjusting command" of the recipe command system vmmda1.0 has a function of heating the wok of the automatic cooking machine to a temperature in a predetermined temperature range, as shown in FIG. 10. The high frequency driving source 132 is controlled according to the different parameters in "F2 heat-adjusting command", and thus the current intensity of the electromagnetic heating coils 12 is controlled, so that the wok 11 may be heated to the temperature in a predetermined temperature range.

Figure 11:
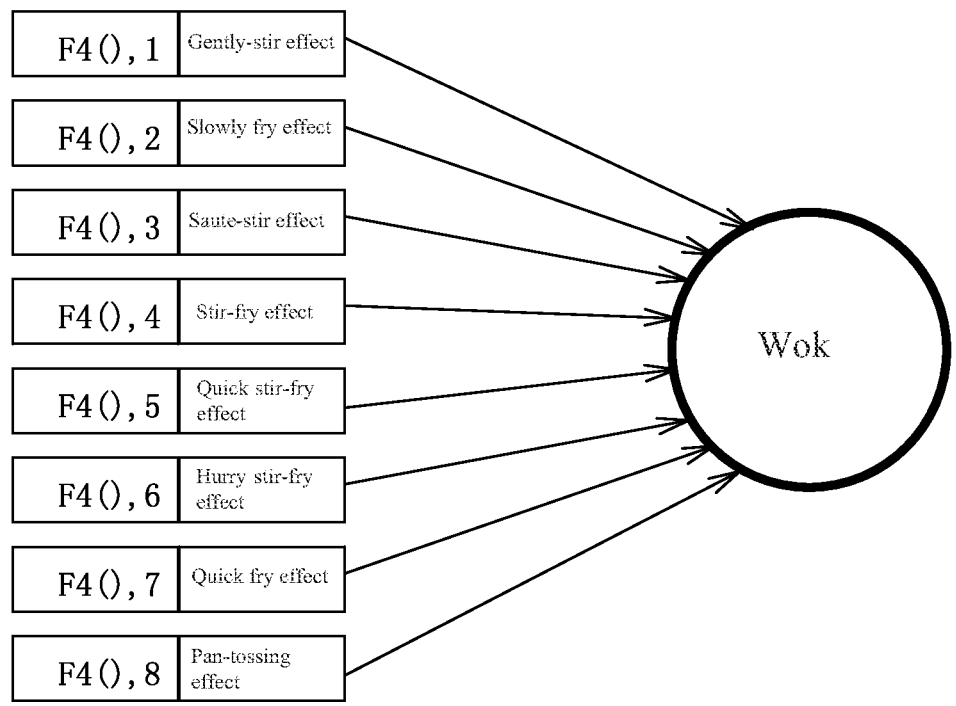
FIG. 11 is a component diagram of the rotating device of the wok apparatus applicable to fully automated cooking machine receiving rotating commands.

In the wok apparatus of the present invention, the wok rotating device 14 cooperates with the main control device 7 of the automatic cooking machine to support "F4 rotating command" of the recipe command system vmmda1.0. The "F4 rotating command" of the recipe command system vmmda1.0 has a function of enabling the wok of the automatic cooking machine to move in a certain manner so as to stir-fry the food in the wok, as shown in FIG. 11. According to the different parameters in "F4 rotating command", the stir-frying motor 142 drives the rotating shaft 141 to rotate in different speed and thus drives the wok 11 rotate in different speed, whereby realizing different stir-frying effects.

In the wok apparatus of the present invention, the wok working position controlling device 15 cooperates with the main control device 7 of the automatic cooking machine to support lots of commands of the recipe command system vmmda1.0. For example:

When the wok working position controlling device 15 receives an accessory ingredient adding control command F6 or a rotating control command F4, the wok 11 is rotated to an accessory ingredient adding working position (rotating working position), so as to perform accessory ingredient adding operation or rotating operation.

When the wok working position controlling device 15 receives a major ingredient feeding control command F1, the wok 11 is rotated to the major ingredient feeding working position, so as to enable the automatic major ingredient feeding device to feed the ingredient into the wok 11 according to the major ingredient feeding control command F1.

When the wok working position controlling device receives a dish discharging control command F8, the wok 11 is rotated to a dish discharging working position according to the dish discharging control command, so as to pour the fried food onto the dish plate of the dish discharging device, and so on.

From the above, the wok apparatus applicable to fully automated cooking machine provided by the present invention has advantages as follows:

1. It is fully automated, and is capable of cooperating with the main control device of the automated cooking machine so as to realize precise heating control required by Chinese culinary art and stir-fry the raw ingredients.

2. Due to the electromagnetic heating and the application of electromagnetic induction eddy current heating principle, a three-dimensional surround hemisphere heating temperature field which heats quickly and has high thermal efficiency is formed in the wok. It is an energy-efficient cooking apparatus which forms a heating temperature field with a similar effect as traditional blowing-type cook-stoves heating wok, and greatly meets the requirement of heating control in Chinese culinary art.

3. Various stir frying effects are realized by utilizing combination control method for rotation motions which is similar to a roller rotating and stirring. Various effects like saute-stirring and stir-frying can be realized by combining various rotation modes including high-speed rotation, low-speed rotation, clockwise rotation and anti-clockwise rotation. By cooperatively using additional stirring pieces arranged in the wok and controlling the inclination angle of the wok frame, the stir frying effect like tossing the pan can be realized.

4. Many functions during the automatic cooking process such as ingredient feeding, cooking, dish discharging, wok washing and so on may be realized by the position control (control of inclination angle) for the wok frame (the wok).

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A wok apparatus applicable to a fully automated cooking machine, characterized by comprising: a frame, a wok, an electromagnetic heating coil, an electromagnetic heating device, a wok rotating device and a wok working position controlling device; wherein the electromagnetic heating coil winds around an external wall of the wok and heats the wok under the control of the electromagnetic heating device; the wok rotating device is connected with the wok so as to control the wok to rotate; the wok working position controlling device is used for securing the wok to the frame and controlling the wok to rotate, so as to enable the wok to rotate to corresponding working positions to perform corresponding operations; the electromagnetic heating device, the wok rotating device and the wok working position controlling device are all connected with a main control device of the cooking machine, so as to receive a control command sent from the main control device according to a preset recipe command, and perform heating, rotating and stir-frying operations for the wok according to the control command;

the wok working position controlling device comprises a wok frame, a main shaft, a position controlling motor and a position controlling detector, wherein the wok frame is used for securing the wok and is held on the frame of the cooking machine by the main shaft, the position controlling motor drives the main shaft to rotate under the control of the main control device, and thus drives the wok frame as well as the wok to rotate to corresponding working positions so as to perform corresponding operations, the position controlling detector is used for detecting rotation angle of the wok frame and the wok and sending the detected data to the main control device;

the wok frame is an n-shaped wok frame, which comprises two vertical poles and a transverse supporting beam arranged between the two vertical poles, wherein the two vertical poles are respectively held on the frame of the cooking machine by the main shaft, the transverse supporting beam is provided with a through-hole at the center so as to allow the rotating shaft of the wok rotating device to pass through, and the transverse supporting beam is also provided with a bearing at the through-hole, the rotating shaft is arranged with a locating ring cooperating with the bearing, so that the wok and the wok rotating device may be fixedly secured on the n-shaped wok frame.

2. The wok apparatus applicable to the fully automated cooking machine as claimed in claim 1, characterized in that: the wok rotating device comprises a rotating shaft and a stir-frying motor, wherein the rotating shaft is fixedly connected with the wok, when the stir-frying motor receives a rotating control command sent from the main control device, the stir-frying motor drives the rotating shaft to rotate and thereby drives the wok to rotate 360 degrees.

3. The wok apparatus applicable to the fully automated cooking machine as claimed in claim 1, characterized in that: the transverse supporting beam is provided with two coil frames extending upwards near the electromagnetic heating coil, for securing the electromagnetic heating coil and allowing the electromagnetic heating coil to wind around the external wall of the wok without contacting.

4. The wok apparatus applicable to the fully automated cooking machine as claimed in claim 3, characterized in that: the electromagnetic heating coil is made of a hemisphere-shaped heat-resistant bobbin would with high frequency fine copper heating coil.

5. The wok apparatus applicable to the fully automated cooking machine as claimed in claim 1, characterized in that: the electromagnetic heating device comprises a wok temperature detector and a high frequency driving source, wherein the high frequency driving source is connected with the electromagnetic heating coil and provides current for flowing through the electromagnetic heating coil to heat the wok when receiving a heating control command sent from the main control device, and the wok temperature detector is used for detecting the temperature of the external wall of the wok and sending the detected data to the main control device.

6. The wok apparatus applicable to the fully automated cooking machine as claimed in claim 1, characterized in that: a body of the wok comprises a hollow cylinder-shaped upper part and a hemisphere-shaped lower part.

7. The wok apparatus applicable to the fully automated cooking machine as claimed in claim 6, characterized in that: a plurality of stirring pieces are arranged on an internal wall of the hemisphere-shaped lower part of the body of the wok.

8. The wok apparatus applicable to the fully automated cooking machine as claimed in claim 6, characterized in that: the electromagnetic heating coil winds around an external wall of the hemisphere-shaped lower part of the body of the wok.

9. The wok apparatus applicable to the fully automated cooking machine as claimed in claim 1, characterized in that: an internal wall of the wok is coated with a non-stick material layer having excellent heat resistance.

* * * * *